United States Patent [19]

Ohnaka

[11] 4,299,533
[45] Nov. 10, 1981

[54] JOINTED MANIPULATOR
[75] Inventor: Makoto Ohnaka, Tsukui, Japan
[73] Assignee: Shiroyama Kogyo Kabushiki Kaisha, Kanagawa, Japan
[21] Appl. No.: 943,966
[22] Filed: Sep. 20, 1978
[30] Foreign Application Priority Data
Jun. 6, 1978 [JP] Japan ................... 53/68115
[51] Int. Cl.³ ........................................... B65G 47/91
[52] U.S. Cl. ................................. 414/752; 271/11; 414/733; 414/737; 74/99 R
[58] Field of Search ............... 414/121, 128, 733, 737, 414/752; 271/11, 14, 90; 74/99 R

[56] References Cited
U.S. PATENT DOCUMENTS
4,065,001 12/1977 Ohnaka ..................... 414/700 X FOREIGN PATENT DOCUMENTS
881929 9/1971 Canada ...................... 414/737

Primary Examiner—Trygve M. Blix
Assistant Examiner—Terrance L. Siemens
Attorney, Agent, or Firm—Zarley, McKee, Thomte, Voorhees & Sease

[57] ABSTRACT

A jointed manipulator is formed of a body, first and second arms, and a holder for an object to be manipulated, wherein the first arm is pivoted to the body, the second arm is pivoted to the first arm, and the holder is pivoted to the second arm, and coupling and constraining mechanisms are provided which limit the relative movements of the parts so that the entire system has only one degree of freedom.

4 Claims, 5 Drawing Figures

JOINTED MANIPULATOR

This invention relates to a jointed manipulator for holding an object and manipulating it, for instance, for transferring it from one position to another, as on an assembly line. Particularly, this invention relates to a jointed manipulator which has a body, a first arm pivoted to the body at one end of the first arm, a second arm pivoted by one of its ends to the other end of the first arm, and a holder which is pivoted to the second arm at the other end of the second arm, which is used by pivoting the first and second arms so as to transfer the object which is held by the holder.

A manipulator of this kind is frequently used for moving an object to and from an automatic press machine or the like, or for transferring an object from a belt conveyor to a processor, etc.

A conventional manipulator of this types includes driving means in the body, one pivoting the first arm and another pivoting the second arm with respect to the first arm (usually by way of chains or the like), and link means which connect the body and the holder so that the holder is maintained in a fixed orientation. Thus the system has two degrees of freedom, since the second arm can be moved independently of the motion of the first arm. Such systems are described in, for example, U.S. Pat. Nos. 2,861,699 and 4,065,001.

Usually in such manipulators the axes of pivoting of the arms and the holder are all parallel, although other possibilities exist; and the following discussion will be conducted on the assumption of parallel axes.

These manipulators have the advantages of simple construction, and furthermore because they have two degrees of freedom the holder can be moved along any complicated locus desired within a certain range, by suitably energizing and synchronizing the operation of the drive means. However, in some applications this flexibility of operation is not necessary. For instance, when the manipulator is used for feeding and clearing a pressing machine, simple straight-line movement of the holder is sufficient. A conventional manipulator with two degrees of freedom, therefore, which requires coordination of the operation of the two drive means, is rather more complicated than necessary for such a function. For automatic operation, the simpler the control of the manipulator, the better.

An important consideration with regard to the design of such a manipulator is that it is desirable that the reach of the arms, in both directions, should be as wide as possible. Therefore it is a design goal for the two arms to be able to be extended so as to be collinear, and for this collinear assembly to be extensible in opposite directions to one side and to the other, so as to maximize the reach of the manipulator.

Therefore, it is an object of the present invention to provide a jointed manipulator which has a simple construction and is controlled simply, and in which the first and the second arms are jointly driven by a single drive means, and are constrained in their movement so that the entire apparatus has one degree of freedom, so that the holder is compelled to move along a single linear locus, to and fro.

It is a further object of the present invention to provide a jointed manipulator in which the first and the second arms, which are constrained in their motion so that the entire apparatus has one degree of freedom, can be extended from their collinerar position on one side of the machine, through their coincident completely folded position, to their collinear fully extended position on the other side of the machine, thus moving the holder through a line from one side of the machine to the other, said line being as long as possible, thus maximising the reach of the machine.

It is still another object of the present invention to provide a jointed manipulator in which a holder is moved linearly and in which it is maintained in the same orientation with respect to the base of the machine while it is being moved.

According to the present invention, there is provided a jointed manipulator comprising:

a body;

a first arm of which one end is pivotally mounted around a first axis to the body;

a second arm of which one end is pivotally mounted around a second axis to the other end of the first arm remote from the body;

a holder for holding material to be manipulated, which is pivotally mounted around a third axis to the other end of the second arm remote from the first arm;

a drive means for pivoting the first arm around the first axis with respect to the body;

a coupling means which pivots the second arm around the second axis with respect to the first arm, the amount of said pivoting bearing a fixed proportional relation to the amount of pivoting provided by the drive means of the first arm around the first axis with respect to the body; and a constraining means which constrains the holder to be in a fixed rotational orientation with respect to the body, as the arms are pivoted, by rotating the holder about the third axis with respect to the second arm.

Other objects, features and advantages will be apparent from the following description of a preferred embodiment, taken with reference to the accompanying drawings, which are given for the sake of illustration only, and thus are not to be considered as limitative of the scope of the invention, and wherein.

Figure 1:
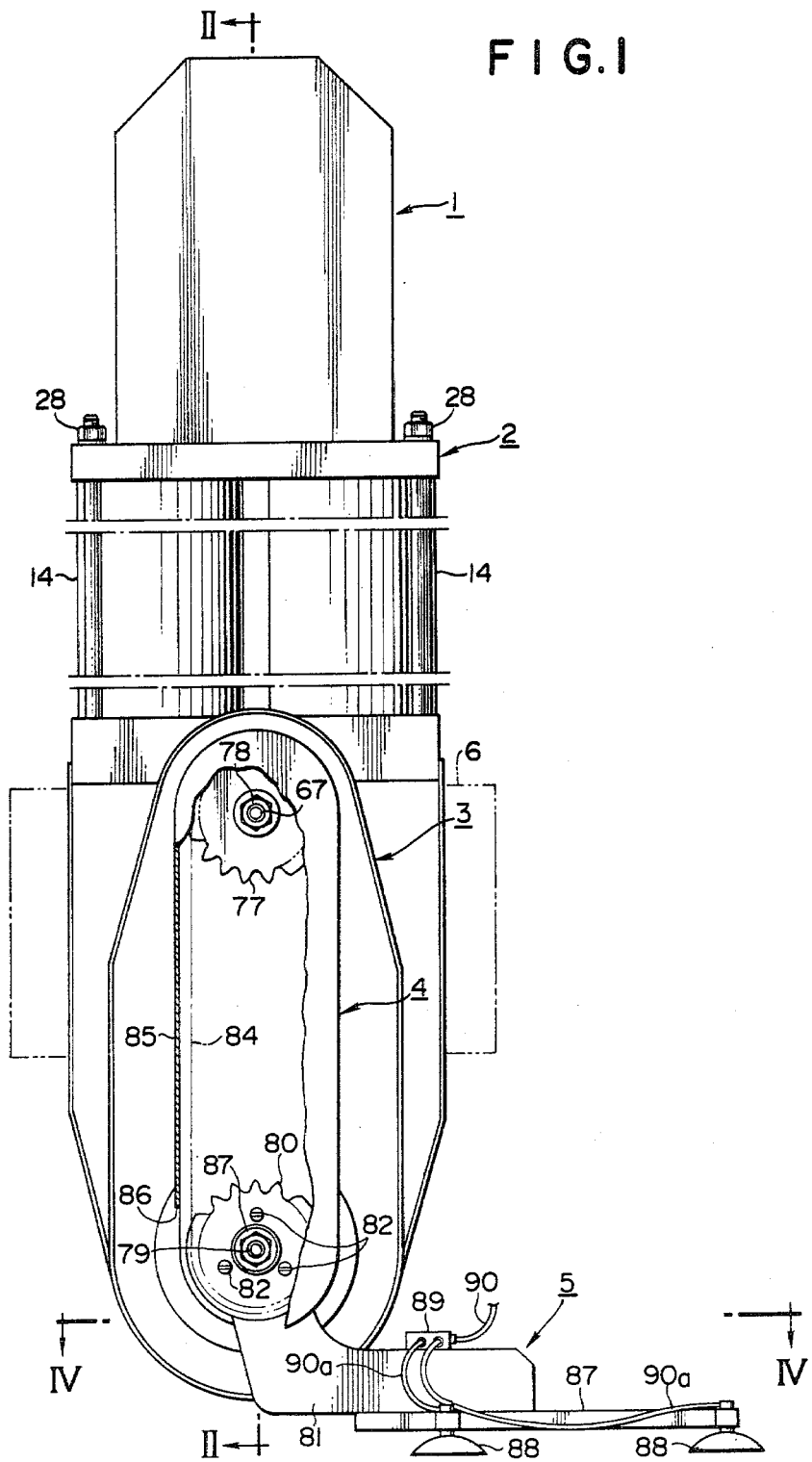
FIG. 1 is a front view partly in section of a jointed manipulator according to the present invention.
Figure 2:
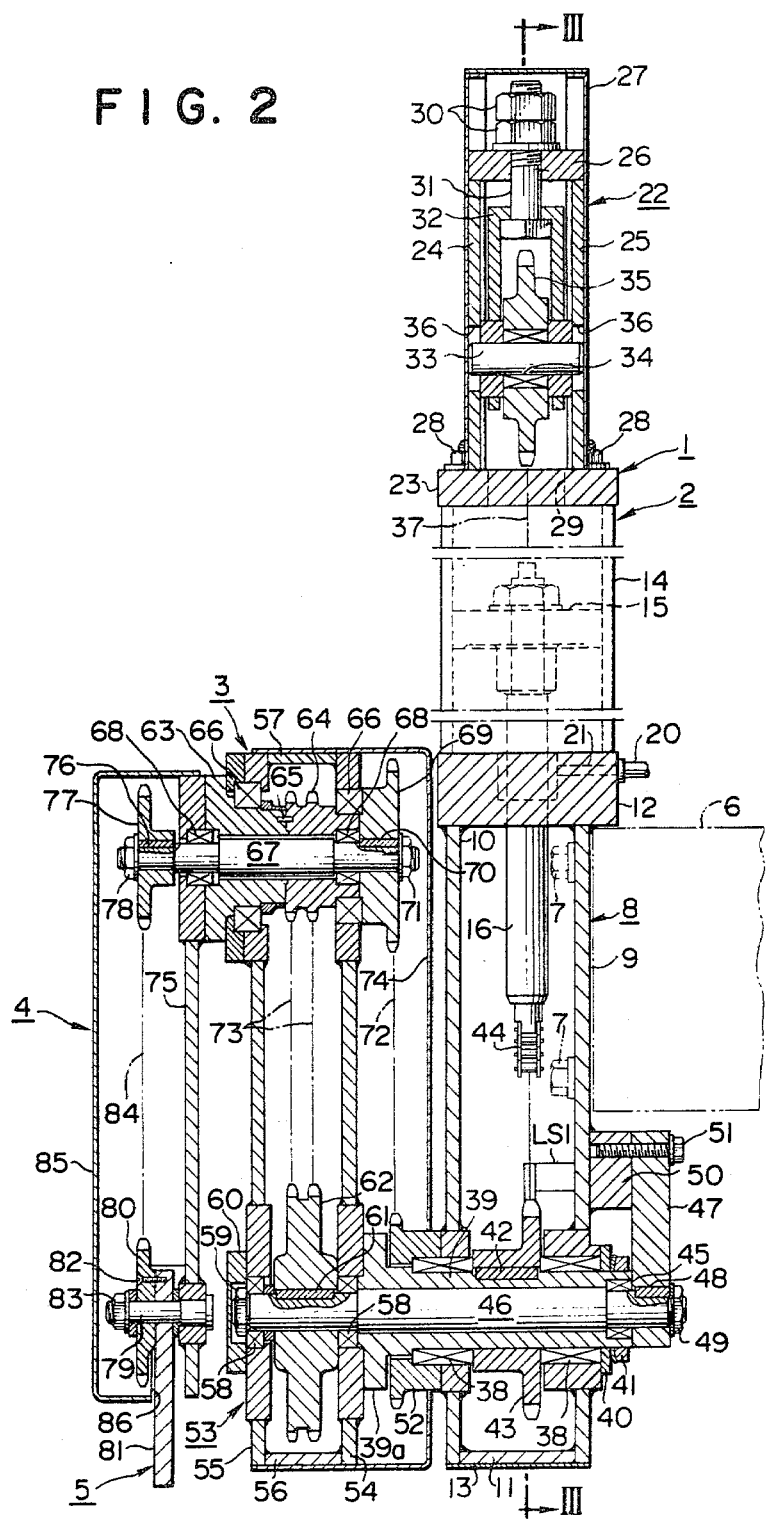
FIG. 2 is a longitudinal sectional view of the manipulator, taken along the line II—II in FIG. 1.

In FIGS. 1 and 2 there is shown a jointed manipulator according to the present invention, which comprises a body 2 fixed to a support, a first arm 3 of which one end is pivotally mounted to the lower end of the body 2, a second arm 4 of which one end is pivotally connected to the other end of the first arm 3, and of which the other end is pivotally connected to a material holder 5 which is adapted to hold a material object to be manipulated.

Accordng to the present invention a coupling means is provided which forces the second arm to rotate relative to the first arm at a rate proportional to the rate at which the first arm rotates relative to the body. Thus the holder is forced to move along a linear locus. In the present embodiment, the second arm is approximately the same length as the first arm, and this proportional rate is approximately two to one, so that this linear locus is in fact a straight line. Other possibilities would be useful, however, in other particular applications. The essence of the present invention is that the assembly of the first and the second arms has one degree of freedom only, and that the second arm is forced to move relative to the first arm at a rate proportional to the rotation rate of the first arm relative to the body.

Further, according to the present invention, a constraining means is provided which constrains the holder for the material to be manipulated to maintain a fixed orientation relative to the body, although of course its actual position changes. This ensures stable manipulation.

Figure 3:
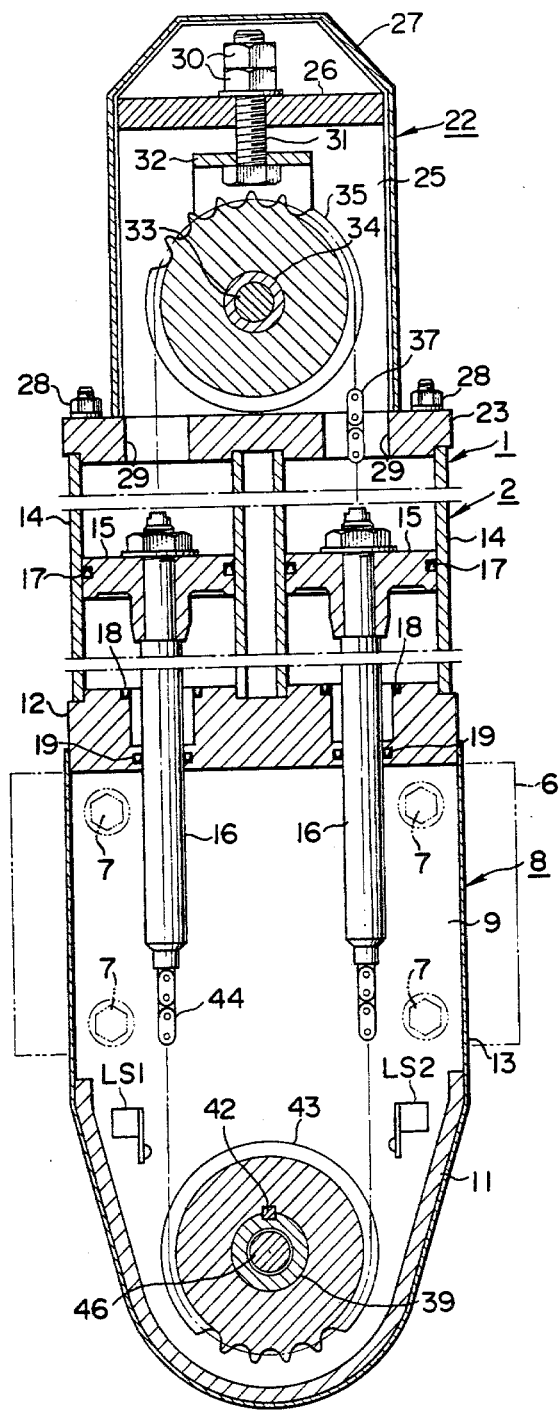
FIG. 3 is a longitudinal sectional view, taken along the line III—III in FIG. 2.

In the present embodiment these coupling and constraining means are provided by assemblies of sprocket wheels and axles and endless chains stretched around the sprocket wheels, in a manner to be described. In other embodiments, however, other arrangements could be used. As shown in FIGS. 2 and 3, the body 2 comprises a lower frame 8 which is secured to the end of a support block 6 which is indicated by two-dotted lines, by bolts 7 also shown by two-dotted lines.

The lower frame 8 comprises a rear plate 9 secured to the support block 6, a front plate 10 which is parallel to the rear plate 9 a certain distance away from it, a bottom plate 11 having a U-shape, which is connected to the lower ends of the rear plate 9 and the front plate 10, an upper plate 12 which is connected to the upper ends of the rear plate 9 and the front plate 10, and a side cover 18 having a U-shape, which is attached around the lower portions of the frame 8.

A pair of fluid pressure cylinders 14 are arranged in parallel as mounted on the upper plate 12, and in each of these a piston 15 is disposed and moves up and down in answer to fluid pressure supplied. To the center of each piston 15 is mounted, by a nut 16a, a piston rod 16 which projects downward through the cylinder 14 and through a hole in the upper plate 12. The outer periphery of the piston 15 and the contact surfaces of the upper plate 12 and the piston rod 16 are sealed by proper sealing materials 17, 18, and 19, as well known in the art.

The space above the pistons 15 in the cylinders 14 is open to the atmosphere, and the spaces below them are supplied with fluid pressure as required by a compressor which is not shown, via holes 21 formed in the upper plate 12 and conduits 20 attached thereto. The pair of cylinders 14 compose substantially one system for driving the manipulator of the present invention.

An upper frame 22 is disposed on the cylinders 14 and comprises a lower plate 23 arranged on the cylinders 14, a pair of front and rear plates 24 and 25 which are mounted on the lower plate 23 parallel to one another a certain distance apart, a top plate 26 placed on top of the front and rear plates 24 and 25, and a top cover 27 which is attached over the top of the top plate 26 as shown in FIG. 3 so as to form a top space thereover. The lower plate 23 of the upper frame 22 is mounted to the upper plate 12 of the lower frame 8 by bolts and nuts 28 via the cylinders 14. The lower plate 23 includes a pair of holes 29, through each of which a chain 37 connected to the top of the piston 15 passes.

In the upper frame 22 a hanger member 32 having an upside-down U-shape is suspended from the top plate 26 in its center by a bolt 31 which is secured to the top plate 26 by a pair of nuts 30. The height of the hanger member 32 may therefore be adjusted by rotating the nuts 30 to raise or lower the bolt 31.

A body sprocket 35 is supported by the hanger member 32 in its lower portion via a support shaft 33 which is extended in the front and rear directions past the hanger member 32, and by bearings 34 such as needle bearings interposed between the sprocket 35 and the support shaft 33. The ends of the support shaft 33 are fitted into longitudinal slots 36 formed in the front and rear plates 24 and 25, so that the support shaft 33 may move upwards and downwards in the slots, but not sideways. The chain 37 passes around the sprocket 35 and each end of it is connected to the top of one of the piston rods 16, after passing through one of the holes 29 in the lower plate 23.

The arrangements for mounting the arm 3 to the body 2 will now be described.

A sleeve 39 is rotatably mounted to the lower portion of the lower frame 8 between the front plate 10 and the rear plate 9 by way of bearings 38 such as needle bearings, and both its ends project to the outside past the plates. On the front end (the left end in FIG. 2) of the sleeve 39 is formed a flange 39a having an enlarged diameter, and on the rear end (the right end in the figure) of the sleeve 39 are disposed a stop plate 40 for retaining the sleeve 39 in place, and the nut 41.

On the outside of the sleeve 39, inside the lower part of the body 2, is secured a drive sprocket 43 by a key 42. Around this drive sprocket 43 passes a chain 44, the ends of which are connected to the lower ends of the piston rods 16.

Thus it will be seen that by supply of fluid pressure to the one or the other of the cylinders 14 the assembly consisting of the cylinders 14, the sprockets 43 and 35, and the chains 37 and 44 may be displaced in the one direction or the other selectively, and thus the drive sprocket 43 may be rotated in the one direction or the other. Thus this assembly constitutes a drive means for the manipulator. The tension of the chains may be adjusted by the nuts 30 in an obvious manner. As may be seen in FIG. 3, there are provided two limit switches $LS_1$ and $LS_2$ on the left and right sides of the rear plate 9 of the lower frame 8 so placed that the left and right piston rods 16 contact and actuate them when the drive sprocket 43 has been rotated through 90° from its central position. The limit switch on the right hand side interrupts supply of fluid to the right hand cylinder 14, when actuated, and conversely. This interruption is performed by electromagnetic valves which are not shown. Thus the rotation of the arms is limited.

Through the hollow inside of the sleeve 39 a first shaft 46 is fitted coaxially, and its ends project outwards from either end of the sleeve 39. On the rear end of the first shaft 46 is secured, by a key 48 and a nut 49, a stop member 47 which extends upwards and is mounted to the lower frame 8 via a block 50 attached thereto by a screw 51. Thus the first shaft 46 is fixed to the lower frame 8, and cannot rotate with respect to it.

As may be seen in FIG. 2, on the lower front surface of the front plate 10 of the lower frame 8 is fixed a sprocket 52 coaxial to the sleeve 39 but not contacting it, which will be hereinafter called the third sprocket. This sprocket also, like the shaft 46, cannot rotate with respect to the body 2.

The first arm 3 is provided with a first arm frame 53 which is connected firmly to the front end of the sleeve 39. This frame 53 comprises a rear plate 54 of which the lower part in the figure is coupled to the front end of the flange 39a of the sleeve 39, a front plate 55 which is parallel to the rear plate 54 and spaced a certain distance away from it, a bottom plate 56 of a U-shape, which is connected to the lower ends of the rear and front plates 54 and 55, and an upper plate 57 which is connected to the upper ends of the front and rear plates 55 and 54. Thus it is seen that the first arm frame 53 may be rotated around the axis of the shaft 46 by rotating the drive sprocket 43 together with the sleeve 39. This axis will hereinafter be called the first axis.

The fixed first shaft 46 passes through the lower portions of the rear and the front plates 54 and 55 of the first arm 3 via bearings 58 mounted to the rear and the front plates 54 and 55. In parenthesis, the rear end of the shaft 46 is also supported in a bearing which is not designated by any reference numeral in FIG. 2 but may be seen therein, and which is fitted in the sleeve 39. The front end of the first shaft 46 projects frontwards past the front plate 55 and is provided with a stop nut 59 mounted on it which prevents the first shaft from slipping out rightwards in the figure. A dust cover 60 is mounted to the front plate 55 over the end of the shaft 46.

A sprocket 62, hereinafter called the first sprocket, with two sets of gear teeth, is secured to the first shaft between the rear and front plates 54 and 55 of the first arm 3, by a key 61. Hence this first sprocket is fixed with respect to the body 2.

The arrangements for mounting the second arm 4 to the first arm 3 will now be described.

At the upper portion in the figure of the first arm 3, which is the other end of it from the end which pivots around the first axis, are arranged an arm sleeve 63 and a second sprocket 64, which has two rows of gear teeth, and these are coupled together by a coupling pin 65. This assembly is pivoted in holes in the front and the rear plates 55 and 54 by bearings 66. The diameter of the first sprocket 62 is twice as large as that of the second sprocket 64. Between these sprockets 62 and 64 are extended a pair of endless chains 73.

A second shaft 67 is coaxially fitted into the combination of the arm sleeve 63 and the second sprocket 64 via bearings 68 mounted therein, and may therefore rotate therein. The ends of the second shaft 67 project out from the ends of the arm sleeve 63.

On the rear end of the second shaft 67 is mounted securely a fourth sprocket 69, via a key 70 inserted therebetween, by a nut 71. An endless chain 72 is stretched between the third sprocket 52 and the fourth sprocket 69. In this embodiment the diameters of the third and the fourth sprockets are the same. A first arm cover 74 is attached to the frame 52 over the sprockets 67 and 52 and the chain 72, and this cover covers up all of the first arm 3 except its front.

The axis of the second shaft 67 and the sleeve 63 and sprockets 64 and 69 will hereinafter be called the second axis.

The second arm 4 includes a frame 75, as shown in FIGS. 1 and 2, and this frame 75 is secured to the front end of the arm sleeve 63 and rotates together therewith about the second axis. A fifth sprocket 77 is mounted to the second shaft 67 at its front end where it projects out of the sleeve 63 by a nut 78, and is secured thereto by a key 76.

In this embodiment the second arm 4 is the same length as the first arm 3. Therefore at the other end of the frame 75 of the second arm 4, at a distance away from the second axis the same as the distance between the first and second axes, is pivotally attached a third shaft 79, which has a sixth sprocket 80 firmly attached to it by a nut 83. The holder for the material to be manipulated, designated by 5, which includes an arm 81 having an L-shape, is also arranged on the third shaft 79 and is mounted to the sixth sprocket 80 by screws 82. An endless chain 84 is stretched between the fifth and sixth sprockets 77 and 80. The axis of the third shaft 79 will hereinafter be called the third axis. In this embodiment the diameters of the fifth and sixth sprockets are the same. A second arm cover 85 is attached over the frame 75 of the second arm 4 and covers the fifth and sixth sprockets 77 and 80 and the chain 84. This cover in fact covers all of the front of the second arm 4, except for the fact that a slit 86 is provided in the lower end portion of the cover so that the arm 81 may be able to rotate around the third axis without interference with the cover.

Figure 4:
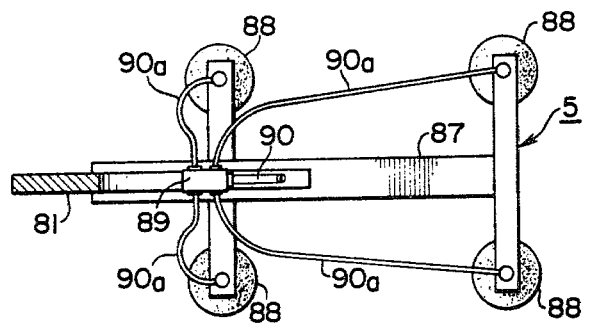
FIG. 4 is a transverse sectional view, taken along the line IV—IV in FIG. 1.

In FIGS. 1 and 4 the material holder 5 is clearly shown. It comprises the arm 81, a holder frame 87, and the suction cups 88 attached to the ends of the frame 87. The holder frame 87 which has an H-shape in plan view is mounted to the bottom of the arm 81. The four suction cups 88 face downwards and are mounted to the four legs of the frame 87. The suction cups are connected each to a branch pipe 90a, which branch pipes are distributed from a conduit 90 by a distributor 89. Vacuum pressure is supplied to these suction cups when required for the operation of the manipulator from a vacuum pump connected to the conduit 90 which is not shown. As an alternative, compressed-air type suction cups in which vacuum is generated by supply of compressed air may be used. In this case the air used may be supplied from the same compressor as is used for the cylinders 14.

In the manipulator described above the first and second sprockets and the chain passed around them, 62, 64, and 73, constitute a coupling means which pivots the second arm around the second axis with respect to the first arm. Since the radius of the second sprocket 64 is half that of the first sprocket 62, and the first sprocket 62 is fixed with respect to the body 2, it will be easily appreciated that, assuming that the apparatus is initially adjusted so that when the first arm is upright the second arm is upright, when the first arm has rotated through an angle x with respect to the vertical, the second arm is forcibly rotated, by the first and second sprockets and chain, through an angle 2x in the contrary direction relative to the first arm, and therefore through an angle of x relative to the vertical, in the contrary direction. Thus the third axis is always maintained at the same level as the first axis, and moves from side to side in a straight line as the drive sprocket is turned by the drive means.

However, this ratio of two to one for the proportion of the amount of turning of the second arm about the first arm to the amount of turning of the first arm about the body is not essential to the principle of the present invention. Any fixed proportion will still cause the third axis to move in a fixed line locus as the apparatus is operated, although such locus would of course not be a straight line. Further, it is not essential to the present invention that the second arm be of the same length as the first arm. That is, it is not essential that the distance between the first and second axes should be equal to the distance between the second and third axes. In some embodiments the second arm might be provided as longer or shorter than the first arm, and, although of course this too would mean that the locus of the third axis would no longer be a straight line, this locus would still be one-dimensional, and the entire apparatus would still have only one degree of freedom, which is the essential principle of this invention.

Further, it would be quite within the scope of this invention to provide the coupling means between the rotations of the first arm about the body and of the second arm about the first arm in a different way, and many other possibilities will be easily evident to one skilled in the mechanical arts.

The third, fourth, fifth, and sixth sprockets 52, 69, 77, and 80 in the embodiment described above, together with the endless chains 72 and 84 stretched around them, constitute a constraining means which, as will be easily clear to any one skilled in the mechanical arts, constrains the arm 81 to be always in the same rotational orientation with respect to the body 2, as it is moved to and fro by operation of the cylinders 14 which rotate the arm 3 about the body, and the drive the third axis along its one-dimentional locus. It will also be clear to anyone skilled in the mechanical arts that the essential condition for this effect, with sprockets and chains substantially as described, is that the product of the diameters of the fourth and sixth sprockets should be equal to the product of the diameters of the third and fifth sprockets.

It would, however, be quite within the scope of the present invention to provide this constraining means for maintaining the arm 81 in the same rotational orientation as the body in a different way, and various other methods will be apparent to one skilled in the mechanical arts, upon mature consideration.

Figure 5:
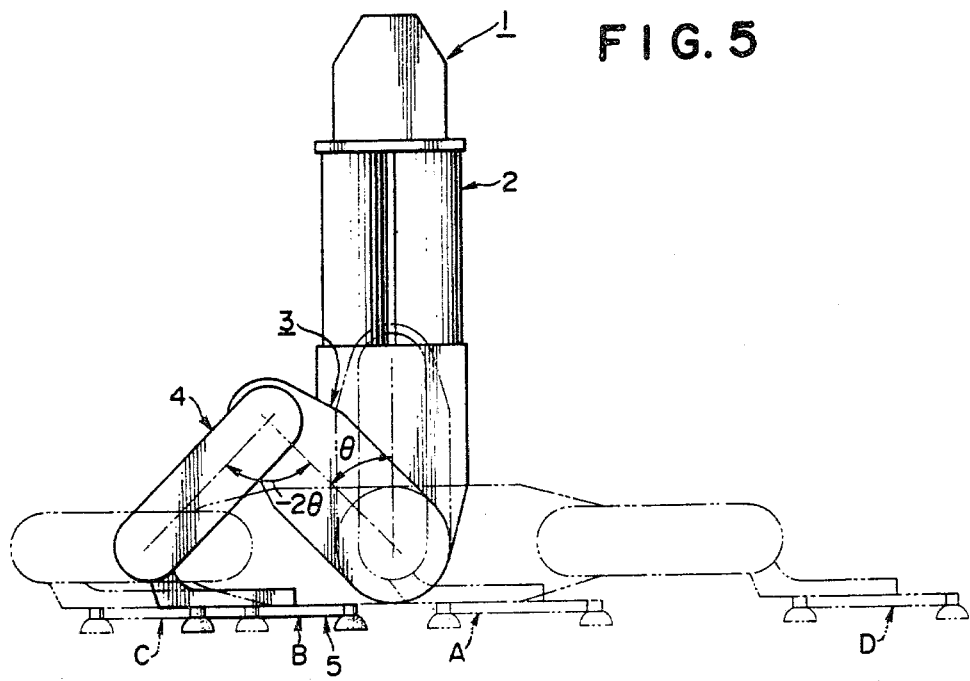
FIG. 5 is a schematic front view of a jointed manipulator according to the present invention, aiding in the explanation of its operation.

FIG. 5 shows how the manipulator described above operates. Two-dotted lines show the arms and holder in the extreme left and right positions C and D, and also in the upright, middle, position A. Solid lines show the arms at an intermediate position B. It is clear that the holder is moved through a strainght line locus, and that, by correctly synchronizing the supply of compressed fluid to fluid to the suction cups on the holder, objects may be picked up and transferred from one side of the machine to the other. The supply of actuating fluid to the suction cups may be correlated with the limit switches $LS_1$ and $LS_2$ which control the fluid cylinders 14, if required.

Thus it is seen that according to the present invention a manipulator is provided which, because it has only one degree of freedom, is simply controlled, and at the same time which has a long reach, since it is possible to extend the arms to their fully extended position on either side of the machine. The simple control is facilitated by the fact that the manipulator of the present invention has only one drive means. Further, the structure of the manipulator of the present invention is simple, and this makes for ease of maintenance.

Although the invention has been shown and described with respect to a preferred embodiment thereof, it should be understood that various changes and modifications could be made therein by a person skilled in the mechanical art, without departing from the scope of the invention, and therefore it is not intended that the description of the embodiment given above should limit the scope of protection sought, which scope is to be defined solely by the appended claims.

What I claim is:
1. A jointed manipulator comprising:
a body;
a first arm of which one end is pivotally mounted around a first axis to the body;
a second arm of which one end is pivotally mounted around a second axis to the other end of the first arm remote from the body;
a holder for holding material to be manipulated, which is pivotally mounted around a third axis to the other end of the second arm remote from the first arm;
a drive means for pivoting the first arm around the first axis with respect to the body;
a coupling means which pivots the second arm around the second axis with respect to the first arm, the amount of said pivoting bearing a fixed proportional relation to the amount of pivoting provided by the drive means of the first arm around the first axis with respect to the body; and
a constraining means which constrains the holder to be in a fixed rotational orientation with respect to the body, as the arms are pivoted, by rotating the holder about the third axis with respect to the second arm,
said first and second arms being approximately the same length and the fixed proportional relation between the amount of pivoting provided by the coupling means of the second arm around the second axis with respect to the first arm, and the amount of the pivoting provided by the drive means of the first arm around the first axis with respect to the body, being approximately 2 to 1,
the coupling means comprising a first sprocket mounted around the first axis and fixed with respect to the body, a second sprocket mounted around the second axis and fixed with respect to the second arm, and an endless chain stretched around the first and second sprockets, said first sprocket being approximately twice the diameter of said second sprocket; and wherein the constraining means comprises a third sprocket mounted around the first axis and fixed with respect to the body, fourth and fifth sprockets mounted around the second axis and fixed with respect to one another, a sixth sprocket mounted around the third axis and fixed with respect to the holder, an endless chain stretched around the third and fourth sprockets and an endless chain stretched around the fifth sprocket, the product of the diameters of the fourth and the sixth sprockets being approximately equal to the product of the diameters of the third and the fifth sprockets, so that the sixth sprocket is approximately fixed in rotational orientation with respect to the body.

2. The manipulator according to claim 1 wherein the first, second and third axes are parallel.

3. A manipulator according to claim 1 or claim 2, wherein the drive means comprises at least one fluid pressure cylinder.

4. A manipulator according to claim 3, wherein the holder is provided with suction cups which hold the material to be manipulated by vacuum suction.

* * * * *